(12) United States Patent
Hsieh et al.

(10) Patent No.: US 8,169,334 B2
(45) Date of Patent: May 1, 2012

(54) MAGNETIC ROTARY ENCODER WITH FEEDBACK UNIT

(75) Inventors: Ming-Hung Hsieh, Taichung (TW); Chien-Wei Yang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 456 days.

(21) Appl. No.: 12/574,204

(22) Filed: Oct. 6, 2009

(65) Prior Publication Data

US 2011/0080298 A1 Apr. 7, 2011

(51) Int. Cl.
*G08B 21/00* (2006.01)

(52) U.S. Cl. ............... 340/686.1; 340/686.3; 340/691.6

(58) Field of Classification Search .................. 340/679, 340/680, 683, 686.1, 686.3, 686.5, 691.1, 340/691.6, 576, 407.1, 407.2; 324/207.16, 324/207.17, 207.24, 207.25; 384/448; 73/865.8
See application file for complete search history.

(56) References Cited

U.S. PATENT DOCUMENTS

| | | | |
|---|---|---|---|
| 5,973,494 A * | 10/1999 | Masreliez et al. | 324/207.24 |
| 6,002,250 A * | 12/1999 | Masreliez et al. | 324/207.16 |
| 6,693,622 B1 * | 2/2004 | Shahoian et al. | 345/156 |
| 6,830,379 B2 * | 12/2004 | Morita et al. | 384/448 |
| 7,096,751 B2 * | 8/2006 | Yagami | 73/865.8 |
| 7,969,288 B2 * | 6/2011 | Braun et al. | 340/407.1 |
| 2007/0014498 A1 * | 1/2007 | Aoki et al. | 384/448 |
| 2010/0102972 A1 * | 4/2010 | Middlekauff et al. | 340/576 |

* cited by examiner

*Primary Examiner* — Van T. Trieu
(74) *Attorney, Agent, or Firm* — Guice Patents PLLC

(57) ABSTRACT

A magnetic rotary encoder with feedback unit, including a base, a cover body, a sensing element and a display element. The base has a hollow main body formed with a receiving space. The receiving space has an opening at one end of the main body. The cover body is disposed at the end of the main body of the base to block the opening. The cover body is formed with a through hole in communication with the receiving space. The sensing element is disposed in the receiving space for sensing the motion of a magnetic element disposed on a rotor of a rotary motor. The display element is arranged on the sensing element in alignment with the through hole of the cover body for receiving signals transmitted from the sensing element. The display element has different display modes in accordance with different signals for a user to easily judge the operation state of the rotary motor.

8 Claims, 4 Drawing Sheets

MAGNETIC ROTARY ENCODER WITH FEEDBACK UNIT

BACKGROUND OF THE INVENTION

The present invention relates generally to a magnetic rotary encoder, and more particularly to a magnetic rotary encoder with feedback unit for monitoring operation state of a rotary motor to avoid damage or overheating of the motor.

Following the advance of science and technology, various motors have been more and more widely applied to different fields. The most often seen conventional motors can be generally divided into two types, that is, outer rotor motors and inner rotor motors. Either type of motor basically includes a hollow housing, a stator disposed in the housing and a rotor disposed in the housing and rotationally drivable by the stator. The stator is composed of multiple silicon steel plates and a coil wound on the silicon steel plates. After the motor is powered on and magnetized, the coil of the stator produces magnetic repulsion force to act on and rotate the rotor.

The stator and the rotor are both installed in the housing. Therefore, it is impossible for a user to directly observe the rotational motion of the rotor from outer side to real-time monitor whether the motor operates normally. Accordingly, if the motor abnormally operates or overheats, in a minor situation, the working efficiency of the motor will be affected and in a more serious situation, the motor may burn out and damage. In order to obviate the above problem, a magnet can be installed on the rotor of the motor and a circuit board is additionally mounted on the housing for detecting rotational motion of the magnet. When the rotor rotates, the magnet is synchronously driven and rotated. At this time, the circuit board monitors the rotational state of the rotor by way of induction. The detected signal is outward transmitted to an alarm for alerting a user of the problem. The above mechanism can be used to monitor the operation state of the motor. However, the alarm is additionally mounted on outer side of the motor. Therefore, a larger room is needed to place the alarm and the manufacturing cost is greatly increased.

SUMMARY OF THE INVENTION

It is therefore a primary object of the present invention to provide a magnetic rotary encoder with feedback unit, which enables a user to easily monitor operation state of a rotary motor.

To achieve the above and other objects, the magnetic rotary encoder with feedback unit of the present invention includes a base, a cover body, a sensing element and a display element. The base has a hollow main body formed with a receiving space. The receiving space has an opening at one end of the main body. The cover body is disposed at the end of the main body of the base to block the opening. The cover body is formed with a through hole in communication with the receiving space. The sensing element is disposed in the receiving space for sensing the motion of a magnetic element disposed on a rotor of a rotary motor. The display element is arranged on the sensing element in alignment with the through hole of the cover body for receiving signals transmitted from the sensing element. The display element has different display modes in accordance with different signals.

The present invention can be best understood through the following description and accompanying drawings wherein:

DETAILED DESCRIPTION OF THE PREFERRED EMBODIMENTS

Figure 1:
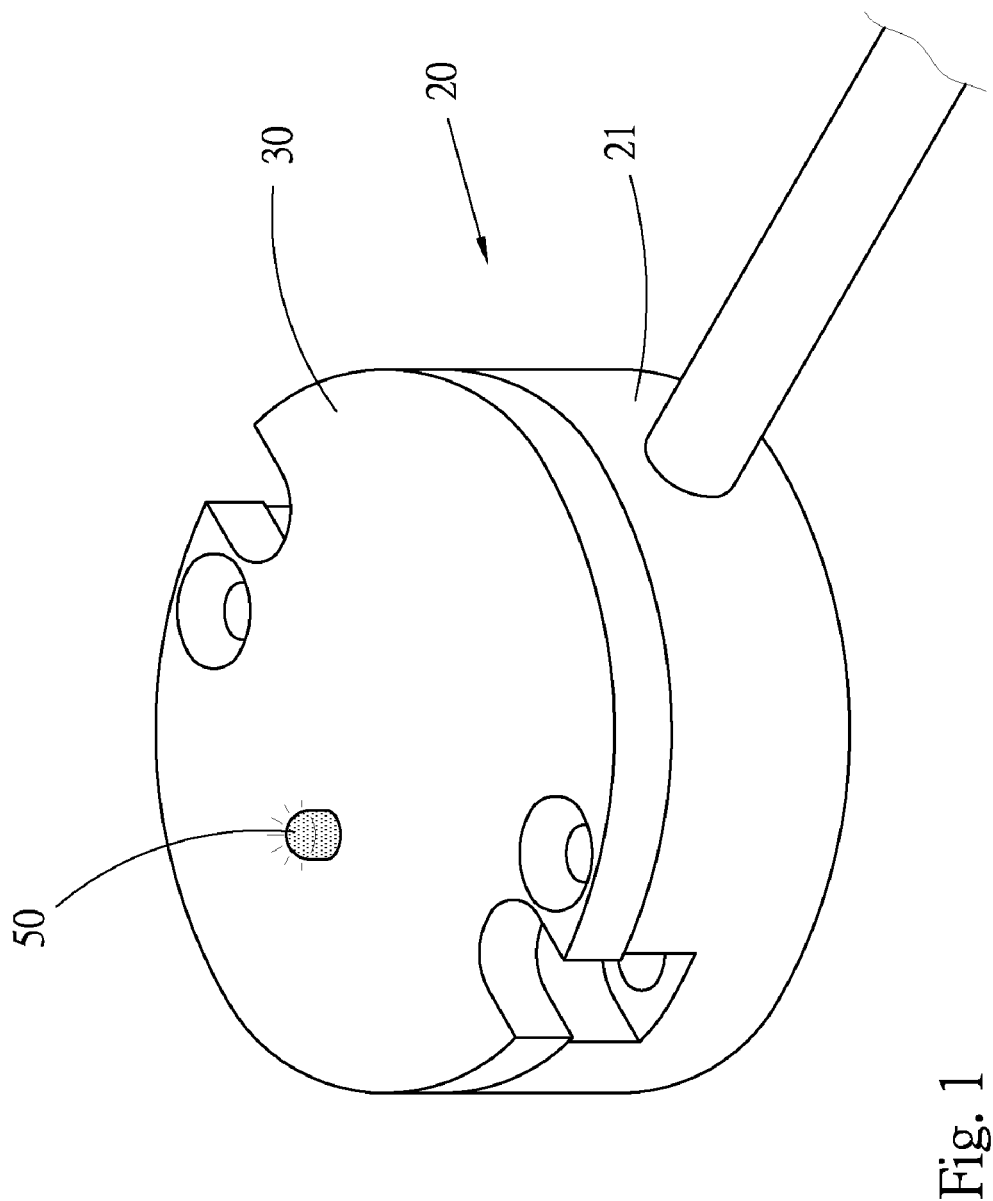
FIG. 1 is a perspective assembled view of a preferred embodiment of the present invention.
Figure 2:
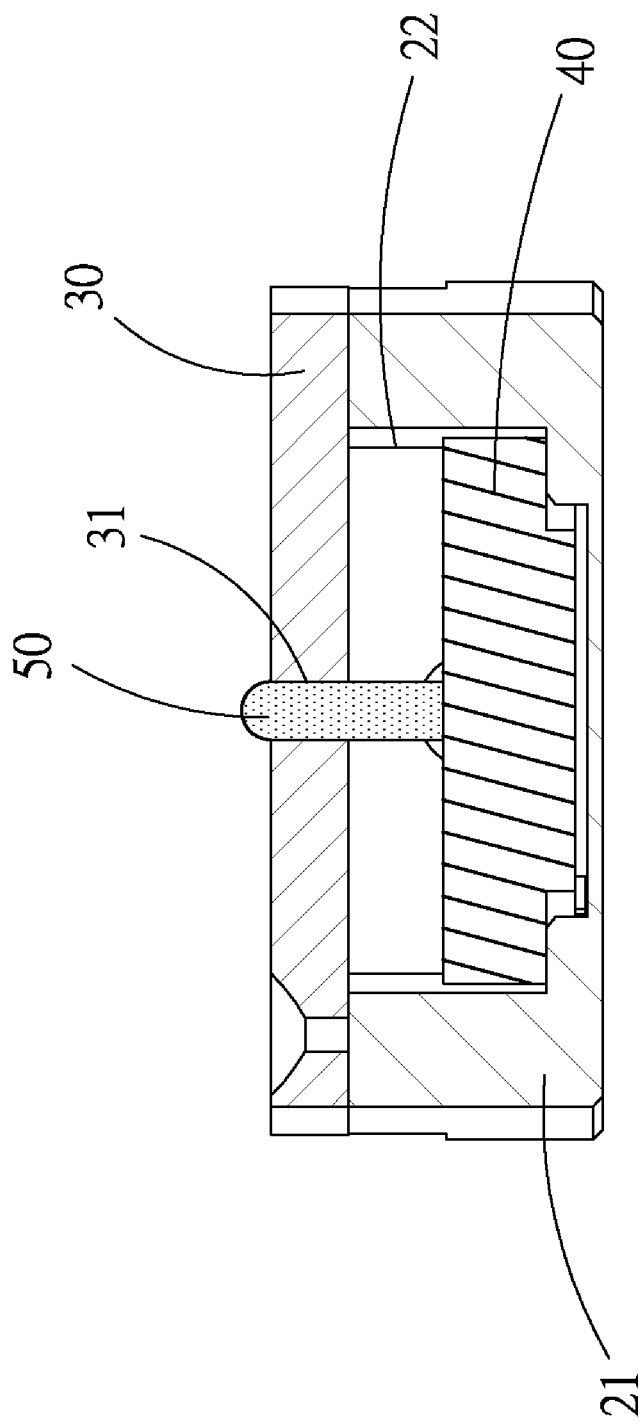
FIG. 2 is a sectional view of the preferred embodiment of the present invention.
Figure 3:
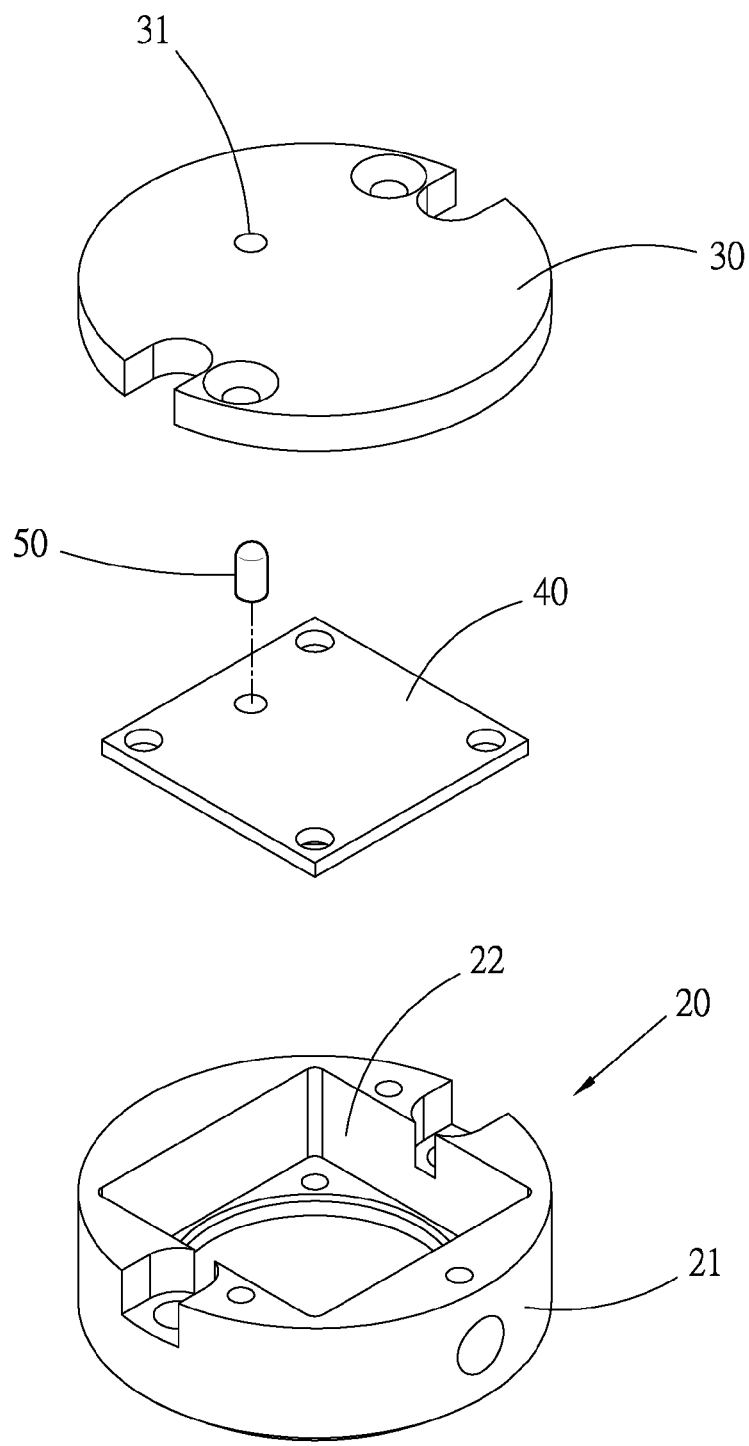
FIG. 3 is a perspective exploded view of the preferred embodiment of the present invention.

Please refer to FIGS. 1 to 3. According to a preferred embodiment, the magnetic rotary encoder 10 with feedback unit of the present invention includes a base 20, a cover body 30, a sensing element 40 and a display element 50.

The base 20 has a cylindrical hollow main body 21 formed with an internal rectangular receiving space 22. The receiving space 22 has an opening on an end face of the main body 21.

The cover body 30 is disposed on the end face of the main body 21 of the base 20 to block the opening.

The sensing element 40 is composed of a magnetic sensor and a circuit board and inlaid in the receiving space 22 for sensing the motion of a magnetic element disposed on a rotor of a rotary motor.

In this embodiment, the cover body 30 is locked with the base 20 by means of threaded rods or engaged with the base 20 by means of tenons and mortises. The sensing element 40 can be insert-connected with the base 20. The subject of the present invention is neither how the base 20 and the cover body 30 are connected nor how the sensing element 40 is assembled with the base 20. The manner in which these components are connected with each other pertains to prior art and thus will not be further described hereinafter.

To speak more specifically, the present invention is characterized in that the cover body 30 is formed with a through hole 31 with a predetermined dimension in communication with the receiving space 22. The display element 50 is formed of a light-emitting diode and arranged on the sensing element 40 in alignment with the through hole 31 of the cover body 30. The display element 50 is exposed to outer side of the cover body 30 for receiving signals transmitted from the sensing element 40. The display element 50 has different display modes in accordance with different received signals.

The display modes of the display element 50 can be varied according to personal favor of a user. For example, the color of the display element 50 can be changed to indicate different operation states of the motor. In normal operation state, the color can be blue. In case of abnormal operation, the color turns red. Alternatively, The display element 50 can flicker at a frequency in conformity with the operation frequency of the motor for a user to monitor the operation state of the motor.

Figure 4:
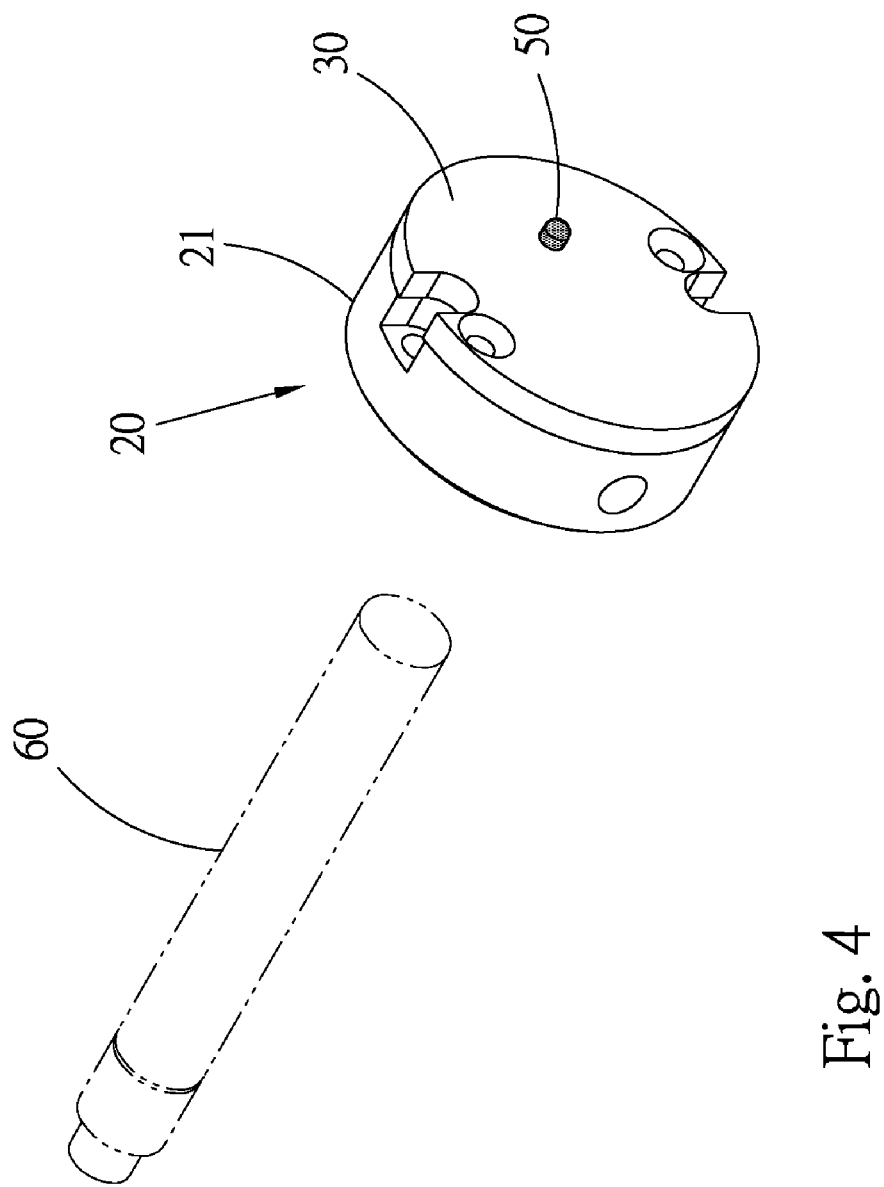
FIG. 4 is a perspective view showing the application of the present invention.

Referring to FIG. 4, the magnetic element is arranged on an end face of the shaft 60 of the rotor of the rotary motor. The base 20 is coaxially positioned beside the shaft 60 of the rotor with the sensing element adjacent to the magnetic element. After the rotary motor is powered on and magnetized, a magnetic field is produced to drive and rotate the shaft 60 of the rotor, whereby the magnetic element is synchronously rotated. At this time, the sensing element 40 detects the frequency of conversion of polarity and transmits a corresponding signal to the display element 50. The display element 50 then displays a signal in a display mode in accordance with the received signal. Accordingly, a user can easily and clearly know the operation states of the rotary motor, including rotational speed, frequency, position, etc. from the display mode of the display element 50.

In this embodiment, the display element 50 outward protrudes from the through hole 31 and is exposed to upper side of the cover body 30. Alternatively, the display element 50 can be embedded in the through hole 31 to achieve the same effect. In this case, a user can also easily observe the display element 50 to know the operation state of the motor.

According to the above arrangement, the magnetic rotary encoder 10 with feedback unit of the present invention has the following advantages:

1. The magnetic rotary encoder with feedback unit can be easily installed and applied to various rotary motors.
2. A user can easily know the operation state of the motor from the display element 50.

The above embodiments are only used to illustrate the present invention, not intended to limit the scope thereof. Many modifications of the above embodiments can be made without departing from the spirit of the present invention.

What is claimed is:

1. A magnetic rotary encoder with feedback unit, comprising:
    a base having a main body formed with an internal receiving space, the receiving space having an opening at one end of the main body;
    a cover body disposed at the end of the main body of the base to block the opening; and
    a sensing element disposed in the receiving space in adjacency to a magnetic element disposed on a rotor of a motor for sensing the motion of the magnetic element, the magnetic rotary encoder being characterized in that the cover body is formed with a through hole in communication with the receiving space, a display element being arranged on the sensing element in alignment with the through hole for receiving signals transmitted from the sensing element, the display element then displaying signals in different display modes in accordance with the received signals.

2. The magnetic rotary encoder with feedback unit as claimed in claim 1, wherein the sensing element is a circuit board having a magnetic sensor.

3. The magnetic rotary encoder with feedback unit as claimed in claim 2, wherein the display element is a light-emitting diode.

4. The magnetic rotary encoder with feedback unit as claimed in claim 1, wherein the display element is embedded under the cover body.

5. The magnetic rotary encoder with feedback unit as claimed in claim 4, wherein the display element is a light-emitting diode.

6. The magnetic rotary encoder with feedback unit as claimed in claim 1, wherein the display element extends through the through hole of the cover body to upward protrude from the cover body.

7. The magnetic rotary encoder with feedback unit as claimed in claim 6, wherein the display element is a light-emitting diode.

8. The magnetic rotary encoder with feedback unit as claimed in claim 1, wherein the display element is a light-emitting diode.

* * * * *